(12) United States Patent
Artis

(10) Patent No.: US 8,095,315 B2
(45) Date of Patent: Jan. 10, 2012

(54) METHOD OF GENERATION AND METEOROLOGICAL SYSTEM WITH PROGRESSIVE PREDICTION OF METEOROLOGICAL SITUATIONS AROUND A CARRIER

(75) Inventor: Jean-Paul Artis, Plouzane (FR)

(73) Assignee: Thales (FR)

( * ) Notice: Subject to any disclaimer, the term of this patent is extended or adjusted under 35 U.S.C. 154(b) by 340 days.

(21) Appl. No.: 12/280,742

(22) PCT Filed: Feb. 26, 2007

(86) PCT No.: PCT/EP2007/051809
§ 371 (c)(1),
(2), (4) Date: Jan. 28, 2009

(87) PCT Pub. No.: WO2007/099080
PCT Pub. Date: Sep. 7, 2007

(65) Prior Publication Data
US 2009/0132167 A1    May 21, 2009

(30) Foreign Application Priority Data
Feb. 28, 2006  (FR) ...................................... 06 01770

(51) Int. Cl.
*G01W 1/00* (2006.01)
*G08G 5/00* (2006.01)
(52) U.S. Cl. .......................... 702/3; 340/949; 73/170.16
(58) Field of Classification Search ............. 702/3, 1–2, 702/5, 127, 142–144, 150, 152, 155–159, 702/166–167, 179, 189; 73/170.16–170.18, 73/178 R; 340/949, 968–969; 342/26 B, 342/26 D, 26 R; 367/87, 89, 91, 95, 99, 118; 703/2, 5

See application file for complete search history.

(56) References Cited

U.S. PATENT DOCUMENTS

| | | | |
|---|---|---|---|
| 6,438,253 B1 * | 8/2002 | Barbaresco et al. | 382/103 |
| 6,828,922 B1 | 12/2004 | Gremmert et al. | |
| 2002/0039072 A1 | 4/2002 | Gremmert et al. | |

FOREIGN PATENT DOCUMENTS

| | | | |
|---|---|---|---|
| EP | 0962890 A1 | | 12/1999 |
| EP | 962890 A1 * | | 12/1999 |

* cited by examiner

*Primary Examiner* — Eliseo Ramos Feliciano
*Assistant Examiner* — Toan Le
(74) *Attorney, Agent, or Firm* — Lowe Hauptman Ham & Berner, LLP

(57) ABSTRACT

The disclosure relates to a meteorological system and a method of generation with progressive prediction of data relating to the meteorological situation around a carrier. In at least one embodiment, the method includes reading data relating to the speed of the carrier and to the cloud formations and calculating for each cloud formation the geographical position and the vector of voluminal parameters predicted at a given time horizon. The time horizon is dependent for each cloud formation on the speed of the carrier and the distance separating the cloud formation from the carrier. The method also includes generating a mapping including a representation corresponding to the calculated geographical position and to the calculated vector of voluminal parameters of each cloud formation.

7 Claims, 2 Drawing Sheets

METHOD OF GENERATION AND METEOROLOGICAL SYSTEM WITH PROGRESSIVE PREDICTION OF METEOROLOGICAL SITUATIONS AROUND A CARRIER

CROSS-REFERENCE TO RELATED APPLICATIONS

The present Application is based on International Application No. PCT/EP2007/051809, filed on Feb. 26, 2007, which in turn corresponds to French Application No. 06 01770 filed on Feb. 28, 2006, and priority is hereby claimed under 35 USC §119 based on these applications. Each of these applications are hereby incorporated by reference in their entirety into the present application.

FIELD OF THE INVENTION

The invention relates to a method of generation with progressive prediction of data relating to the meteorological situation around a carrier. The subject of the invention is also an onboard meteorological system with progressive prediction of meteorological situations around a carrier. In particular, the invention applies to meteorological systems onboard aircraft comprising a meteorological radar allowing the prediction of the evolution of cloud formations.

BACKGROUND OF THE INVENTION

Meteorological systems embedded onboard aircraft make it possible notably to map the cloud formations in proximity to the craft, for example with the aid of a meteorological radar. Thus, in the radius of action of the onboard meteorological system, it is possible to detect and locate the cloud formations that may be unpleasant for the passengers, or indeed dangerous. Generally, the meteorological system has a screen summarizing the current meteorological situation through an image. The pilot must anticipate any risks in correlation with the aircraft's future trajectory, provided for example by a flight management system.

However, the human interpretation of such images over time is particularly complex. On the one hand, the images presented on the screen of the meteorological system do not allow the pilot to apprehend the evolution of the cloud formations. To solve this problem, a method for dynamically tracking the evolution of deformable media and predicting their evolution making it possible notably to establish a forecast at a given time horizon of the evolutions of the various cloud formations is known for example from patent EP 0962890 published on 8 Dec. 1999. On the other hand, the pilot must be able to adjust if possible the trajectory of the aircraft as a function of the location of the cloud formations.

A known solution to this problem is to generate two distinct maps: a first map comprising representations of cloud formations at a given instant and a second map comprising representations of cloud formations such as they have been predicted at a given time horizon. Certain systems propose the generation on one and the same map of the representations of the cloud formations at a given instant and the representations of the cloud formations predicted at a given time horizon.

Now, the maps thus generated do not integrate the trajectory of the aircraft. The future geographical location of the predicted cloud formations displayed does not therefore take account of the trajectory of the aircraft: the pilot who reads the map thus generated must therefore mentally integrate the movements of the aircraft so as to be able to usefully utilize the map generated. This task may turn out to be particularly tricky when the trajectory of the aircraft is complex. Furthermore, because of the concentration asked of the pilot in performing this task, interpretation errors that are detrimental to the safety of the aircraft may therefore occur.

SUMMARY OF THE INVENTION

The aim of the invention is notably to alleviate the aforesaid drawbacks. The subject of the invention is notably a method of generation with progressive prediction of meteorological situations around a carrier. The method comprises the following steps:
 (a) a step of reading data relating to the speed of said carrier;
 (b) a step of reading data relating to the cloud formations present around said carrier;
 (c) steps of calculating for each cloud formation the geographical position and the vector of voluminal parameters predicted at a given time horizon, said time horizon being dependent for each cloud formation on the speed of said carrier and the distance separating the cloud formation from the carrier;
 (d) a step of generating a mapping comprising a representation corresponding to the geographical position and to the topology that were calculated in step (c) of each cloud formation.

In an embodiment, on the basis of the geographical position, of the distance from the carrier and of the advection speed vector of each cloud formation, the modulus of the speed of the carrier being extracted from the data relating to the speed of the carrier, the position of each cloud formation predicted at a given time horizon is calculated using the following mathematical relation:

$$PN_{map} = PN + Va \times \frac{DN}{Vp}.$$

In an embodiment, on the basis of the voluminal parameter vector, of the distance from the carrier and of the convection speed vector of each cloud formation, the modulus of the speed of the carrier being extracted from the data relating to the speed of the carrier, the vector of voluminal parameters predicted at a given time horizon is calculated using the following mathematical relation:

$$VN_{map} = VN + Vc \times \frac{DN}{Vp}.$$

Advantageously, the vector of voluminal parameters comprises at least one skeleton of closed contours, modeling the topology of said cloud formation.

The subject of the invention is further a system with progressive prediction of meteorological situations around a carrier comprising at least one computer and at least one display device. The computer comprises one or more interfaces and/or data busses allowing it to access the speed of the carrier and the information relating to the cloud formations around the carrier. The computer calculates the geographical position and the vector of voluminal parameters predicted at a given time horizon of each cloud formation. The time horizon is dependent for each cloud formation on the speed of the carrier and the distance separating the cloud formation from the carrier. The display device comprises at least one navigation screen on which a mapping is displayed comprising a representation corresponding to the geographical position and to the topology that were calculated by the computer.

In an embodiment, on the basis of the geographical position, of the distance from the carrier and of the advection speed vector of each cloud formation, the modulus of the speed of the carrier being extracted from the data relating to the speed of the carrier, the position of each cloud formation predicted at a given time horizon is calculated by the computer by using the following mathematical relation:

$$PN_{map} = PN + Va \times \frac{DN}{Vp}.$$

In an embodiment, on the basis of the voluminal parameter vector, of the distance from the carrier and of the convection speed vector of each cloud formation, the modulus of the speed of the carrier being extracted from the data relating to the speed of the carrier, the vector of voluminal parameters predicted at a given time horizon is calculated by the computer by using the following mathematical relation:

$$VN_{map} = VN + Vc \times \frac{DN}{Vp}.$$

The vector of voluminal parameters can comprise at least one skeleton of closed contours, modeling the topology of said cloud formation.

Advantageously, the speed of the carrier can be extracted from a flight management system.

Advantageously, the information relating to the cloud formations around the carrier is for example constructed on the basis of the information delivered by one or more meteorological radars. The display device can furthermore be shared with other onboard devices embedded in the carrier.

The advantages of the invention are notably that it makes it possible to have no negative impacts on the operational dependability of the meteorological system according to the invention, the cloud formations predicted in proximity to the aircraft being calculated at a near time horizon.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
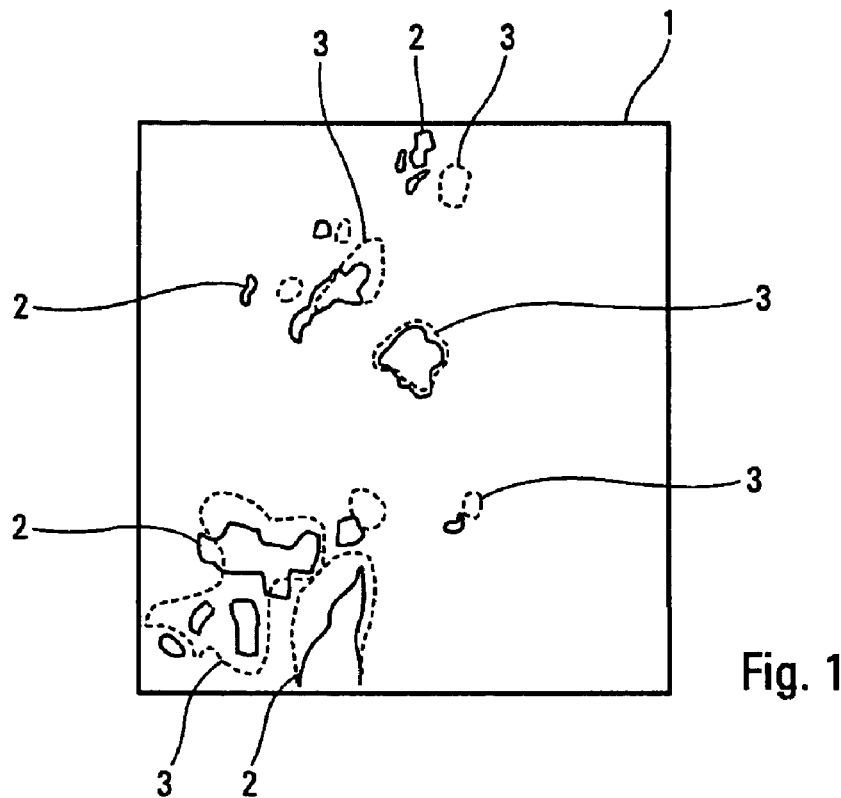
FIG. 1, a mapping produced by a meteorological system according to the state of the art.

FIG. 1 shows a mapping produced by a meteorological system according to the state of the art. The meteorological systems onboard carriers, such as for example aircraft, generally comprise one or more devices for displaying the meteorological situation 1 at a given time horizon. So, with the aid notably of the information arising from an onboard meteorological radar aboard the carrier, a computer generates a representation of the cloud formations around the carrier. For certain meteorological systems, the device for displaying the meteorological situation 1 displays only the representation of the observed cloud formations 2, that is to say the whole set of cloud formations observed by the meteorological radar at a given instant in a delimited geographical zone around the carrier. For other meteorological systems, the device for displaying the meteorological situation 1 displays in addition to the representation of the observed cloud formations 2, the representation of the predicted cloud formations 3. The representation of the predicted cloud formations 3 can notably be generated on the basis of a method for dynamically tracking the evolution of deformable media and predicting their evolution. By way of example, patent EP 0962890 published on 8 Dec. 1999 describes a method making it possible notably to establish a forecast at a given time horizon of the evolutions of the various cloud formations.

Figure 2:
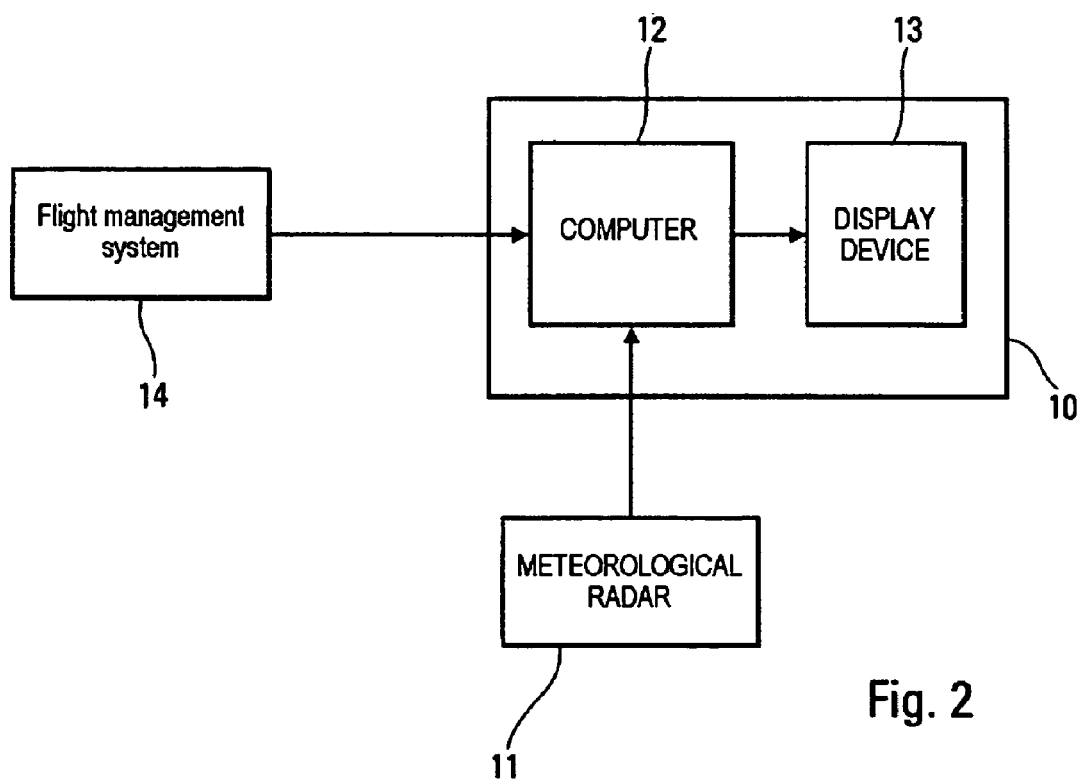
FIG. 2, a meteorological system according to the invention with progressive prediction of meteorological situations around a carrier.

FIG. 2 shows a meteorological system according to the invention with progressive prediction of meteorological situations around a carrier. In FIG. 2, the meteorological system 10 according to the invention comprises at least one computer 12 and at least one display device 13. The function of the computer 12 is furthermore to implement the method according to the invention of generation with progressive prediction of meteorological situations around a carrier, described subsequently notably with the aid of FIGS. 3 and 4. The computer 12 can be a digital computer, having for example one or more processors suited to digital calculations. The computer 12 furthermore has one or more interfaces and/or data busses allowing it to access on the one hand the speed or more generally the trajectory of the carrier and on the other hand the information relating to the cloud formations around the carrier. The trajectory of the carrier may for example arise from a flight management system 14. The trajectory of the carrier, that is to say at least the speed of the carrier, may however be delivered by any other device delivering complete or partial information regarding trajectory or information which makes it possible to deduce this information. This information may further be delivered by several devices in combination. Inertial platforms or else satellite navigation systems may be cited by way of example as a source of trajectory information. The meteorological situation around the carrier can notably be constructed on the basis of the information delivered by one or more meteorological radars 11. The function of the meteorological radar 11 is notably to detect and locate the cloud formations in proximity to the craft and therefore to provide information making it possible to establish the meteorological situation around the carrier. The computer may however be provided with the meteorological situation around the carrier by another type of device suited to this function: it is possible notably to think of a device receiving meteorological information originating from another carrier, from meteorological ground stations and/or else from meteorological or communications satellites.

The computer 12 on the basis notably of the information gathered relating to the trajectory of the carrier and to the meteorological situation around the carrier generates with the aid of the method according to the invention of generation with progressive prediction of meteorological situations around a carrier a mapping comprising cloud formations predicted as a function of the trajectory of the carrier. The display device 13 receives and displays the mapping comprising cloud formations predicted as a function of the trajectory of the carrier. The display device 13 can notably be a standard display, comprising one or more screens. The display device 13 can furthermore be shared with other onboard devices embedded in the carrier. The display device 13 is refreshed at a tempo compatible with the speed of the carrier.

Figure 3:
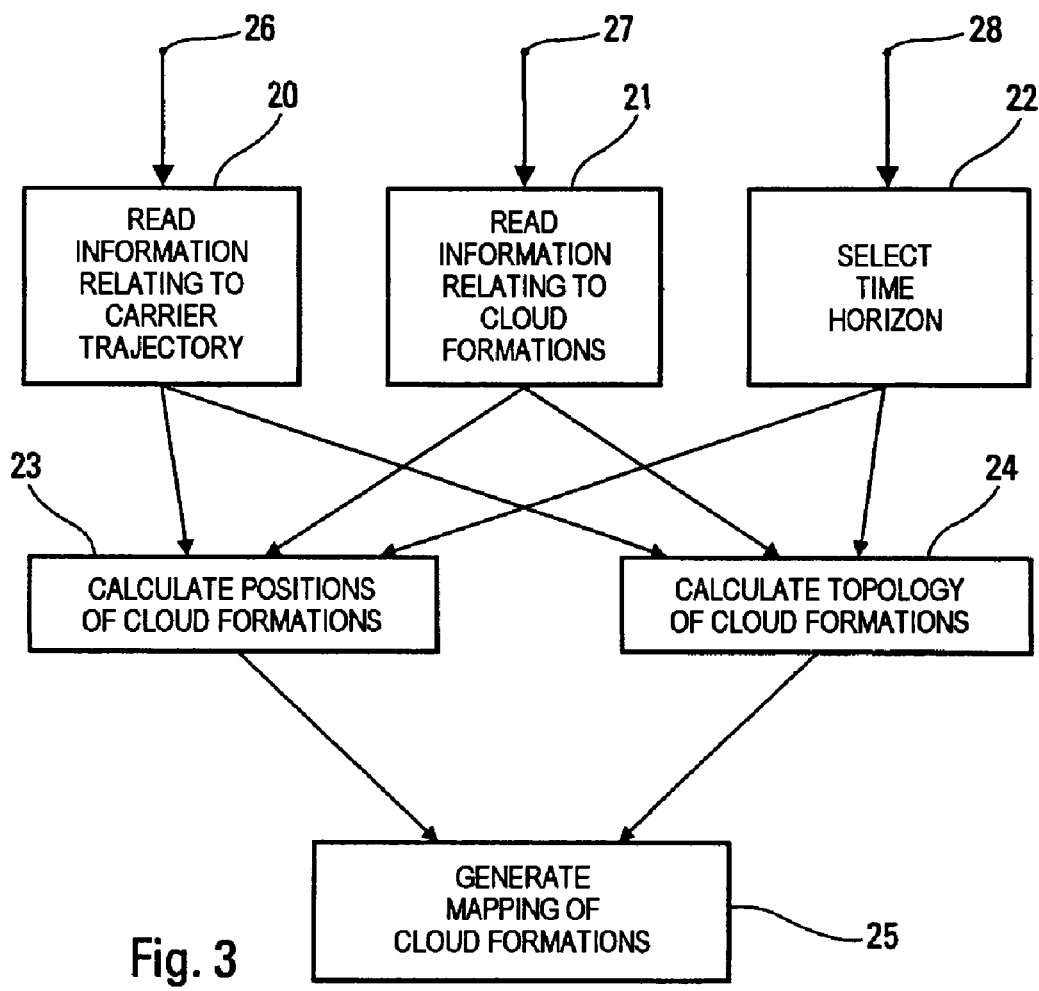
FIG. 3, a schematic of the steps of the method according to the invention of generation with progressive prediction of meteorological situations around a carrier.
Figure 4:
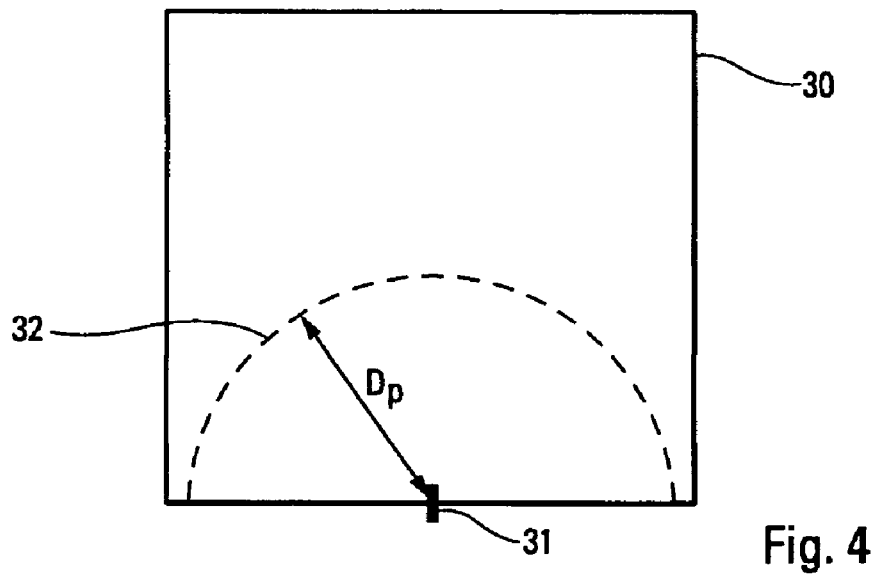
FIG. 4, an embodiment of a display device according to the invention.

FIG. 3 shows through a schematic the steps of the method according to the invention of generation with progressive prediction of meteorological situations around a carrier. Elements identical to the elements already presented in the other figures bear the same references. In a step 20, the data relating to the speed of the carrier 26 or more generally data relating to the trajectory of the carrier comprising at least the absolute value of the speed of said carrier are read. Among the data relating to the trajectory of the carrier 26 may notably be cited, in addition to the speed of the carrier, information making it possible to deduce the speed of the carrier. However, the information relating to the heading of the carrier is not necessary. The data relating to the trajectory of the carrier 26 can be provided by a flight management system 14. In a step 21, information relating to the cloud formations around the carrier 27 is read. The information relating to the cloud formations around the carrier 27 can be provided by a meteorological radar 11. The information relating to the cloud formations can for example comprise information on the topology, the instantaneous speed and the radar echoes of the cloud formations. In an optional step 22, the pilot of the carrier gives an instruction 28 culminating in the selection of a limit time horizon, that is to say the largest time horizon to be included on the mapping. The time horizon corresponds to the time that the carrier will take to reach a given geographical zone. If this step 22 is not performed, then a default value is assigned to the limit time horizon.

In steps 23 and 24 of the method according to the invention, the geographical position $PN_{map}$ and the topology $VN_{map}$ that were predicted at a given time horizon of each cloud formation are calculated, the time horizon being dependent for each cloud formation on the speed Vp of said carrier and the distance DN separating the cloud formation from the carrier.

Thus, in step 23, on the basis of the information received on completion of step 20 of reading the data relating to the trajectory of the carrier 26, of step 21 of reading the information relating to the cloud formations around the carrier, and possibly of step 22 of selecting a given time horizon, the positions of the cloud formations to be included on the mapping are calculated. This step is for example implemented by a computer 12. Thus, for each cloud formation, the geographical position PN of said cloud formation considered and the distance DN to the carrier of said cloud formation considered are known on the basis notably of the information relating to the cloud formations around the carrier. For each cloud formation, the advection speed vector Va is either calculated or received from another device suitable for calculating the advection vectors Va. The advection vector Va corresponds to the speed of geographical displacement of the cloud formation. The advection vector Va gives the relative displacement of a cloud formation in space for a unit of time. The advection vector Va of a given cloud formation can be calculated on the basis of the information relating to the cloud formations around the carrier delivered for example by a meteorological radar with the aid for example of the method for dynamically tracking the evolution of deformable media and predicting their evolution described in patent EP 0962890 published on 8 Dec. 1999. The modulus of the speed of the carrier Vp is extracted from the data relating to the trajectory of the carrier 26. The position of each cloud formation $PN_{map}$ to be integrated on the mapping is calculated using the following mathematical relation:

$$PN_{map} = PN + Va \times \frac{DN}{Vp}$$

In step 24, on the basis of the information received on completion of step 20 of reading the data relating to the trajectory of the carrier 26, of step 21 of reading the information relating to the cloud formations around the carrier, and possibly of step 22 of selecting a given time horizon, the topology of the cloud formations to be included on the mapping are calculated. This step is for example implemented by a computer 12. Thus, for each cloud formation, the voluminal parameter vector VN of said cloud formation considered (also called the topology) and the distance DN of said cloud formation considered to the carrier are known on the basis notably of the information relating to the cloud formations around the carrier. For each cloud formation, the vector of voluminal parameters VN is either calculated or received from another device suitable for calculating the vectors of voluminal parameters. The voluminal parameter vector VN corresponds to a vector comprising the whole set of parameters making it possible to describe the topology of the cloud formation. The vector of voluminal parameters VN may for example take the form of a description of at least one skeleton of closed contours modeling the topology of said cloud formation. To determine the skeleton or skeletons, it is possible for example to implement the Danielson algorithm. For each cloud formation, the convection speed vector Vc (which can also be designated by the term expansion vector) is either calculated or received from another device suitable for calculating the convection vectors Vc. The convection vector Vc corresponds to the speed of voluminal variation of the cloud formation. The convection vector Vc gives the relative displacement of the voluminal parameters of a cloud formation in space for a unit of time. In the case where one or more skeletons are used to describe the topology of a cloud formation, the convection vector Vc describes the evolution of the parameters describing the skeleton or skeletons for a unit of time. The convection vector Vc of a given cloud formation can be calculated on the basis of the information relating to the cloud formations around the carrier delivered for example by a meteorological radar with the aid for example of the method for dynamically tracking the evolution of deformable media and predicting their evolution described in patent EP 0962890 published on 8 Dec. 1999. The vector of voluminal parameters $VN_{map}$ (also called the topology) of each cloud formation to be integrated on the mapping is calculated using the following mathematical relation:

$$VN_{map} = VN + Vc \times \frac{DN}{Vp}$$

In a step 25 of generating the mapping of the cloud formations, once the position $PN_{map}$ and the vector of voluminal parameters $VN_{map}$ of each cloud formation have been calculated, a mapping comprising a representation of each cloud formation corresponding to its position $PN_{map}$ and its voluminal parameters $VN_{map}$ is generated. This mapping thus generated can thereafter be transmitted so as to be notably displayed thereon by the display device 13. This mapping can furthermore comprise another representation making it possible for example to improve the intelligibility of the map. Furthermore, various color codes as a function for example of the dangerousness of the various cloud formations can be employed. The dangerousness of the cloud formations can for example be determined as a function of the distance of the cloud considered with respect to the carrier and/or by the convection vector Vc. Subsidiarily, the position as well as the current topology of the cloud formations can be displayed in parallel, for example superimposed.

FIG. 3 illustrates an embodiment of a display device according to the invention. Elements identical to the elements already presented in the other figures bear the same references. The display device 13 comprises at least one navigation screen 30. The function of the navigation screen 30 is notably to display the cloud formations mapping generated by the method according to the invention. The position of the carrier 31 is situated at the center of the bottom side of the navigation screen 30. The semicircle 32 represents the prediction locus over a time horizon t equal to Dp/Vp, the distance $D_p$ being equal to the radius of the semicircle 32. The semicircle 32 shows the set of points where the position and the topology of the displayed cloud formations are predicted on the basis of one and the same given time horizon, that is to say predicted at one and the same given future instant.

It will be readily seen by one of ordinary skill in the art that the present invention fulfils all of the objects set forth above. After reading the foregoing specification, one of ordinary skill in the art will be able to affect various changes, substations of equivalents and various aspects of the invention as broadly disclosed herein. It is therefore intended that the protection granted hereon be limited only by definition contained in the appended claims and equivalents thereof.

The invention claimed is:

1. A method of generation with progressive prediction of meteorological situations around a carrier by a meteorological system, the method comprising:
   reading data relating to a speed of said carrier;
   reading data relating to cloud formations present around said carrier;
   calculating, by the meteorological system, for each cloud information a geographical position ($PN_{map}$) and a vector of voluminal parameters ($VN_{map}$) predicted at a given time horizon, said time horizon being dependent for each cloud formation on the speed (Vp) of said carrier and a distance (DN) separating the cloud formation from the carrier; and
   generating a mapping comprising a representation corresponding to the geographical position ($PN_{map}$) and to the vector of voluminal parameters ($VN_{map}$) calculated for each cloud formation,
   wherein, on the basis of a geographical position (PN), of the distance (DN) from the carrier, and of the advection speed vector (Va) of each cloud formation, the modulus of the speed of the carrier (Vp) is extracted from the data relating to the speed of the carrier, the position of each cloud formation ($PN_{map}$) predicted at the given time horizon is calculated using the following mathematical relation:

$$PN_{map} = PN + Va \times \frac{DN}{Vp}$$

wherein, on the basis of a voluminal parameter vector (VN), of the distance (DN) from the carrier, and of the convection speed (Vc) of each cloud formation, the modulus of the speed of the carrier (Vp) is extracted from the data relating to the speed of the carrier, the vector of voluminal parameters ($VN_{map}$) predicted at the given time horizon is calculated using the following mathematical relation:

$$VN_{map} = VN + Vc \times \frac{DN}{Vp}.$$

2. The method as claimed in claim 1, wherein the voluminal parameter vector (VN) comprises at least one skeleton of closed contours, modeling the vector of voluminal parameters of said cloud formation.

3. A system with progressive prediction of meteorological situations around a carrier, comprising:
   a computer; and
   at least one display device,
   wherein the computer comprises one or more interfaces and/or data buses allowing the computer to access a speed of the carrier and information relating to the cloud formations around the carrier, the computer is configured to calculate a geographical position ($PN_{map}$) and a vector of voluminal parameters ($VN_{map}$) predicted at a given time horizon for each cloud formation, said time horizon is dependent for each cloud formation on the speed (Vp) of said carrier and a distance (DN) separating the cloud formation from the carrier; the display device comprises at least one navigation screen on which a mapping is displayed, and the mapping comprises a representation corresponding to the geographical position ($PN_{map}$) and to the vector of voluminal parameters ($VN_{map}$) calculated by the computer,
   wherein, on the basis of a geographical position (PN), of the distance (DN) from the carrier, and of the advection speed vector (Va) of each cloud formation, the modulus of the speed of the carrier (Vp) is extracted from the data relating to the speed of the carrier, the position of each cloud formation ($PN_{map}$) predicted at the given time horizon is calculated by the computer by using the following mathematical relation:

$$PN_{map} = PN + Va \times \frac{DN}{Vp}$$

wherein, on the basis of a voluminal parameter vector (VN), of the distance (DN) from the carrier, and of the convection speed (Vc) of each cloud formation, the modulus of the speed of the carrier (Vp) is extracted from the data relating to the speed of the carrier, the vector of voluminal parameters ($VN_{map}$) predicted at the given time horizon is calculated by the computer by using the following mathematical relation:

$$VN_{map} = VN + Vc \times \frac{DN}{Vp}.$$

4. The system as claimed in claim 3, wherein the voluminal parameter vector (VN) comprises at least one skeleton of closed contours, modeling the vector of voluminal parameters of said cloud formation.

5. The system as claimed in claim 4, wherein the speed of the carrier is extracted from a flight management system.

6. The system as claimed in claim 5, wherein the information relating to the cloud formations around the carrier is constructed on the basis of the information delivered by one or more meteorological radars.

7. The system as claimed in claim 6, wherein the display device is shared with other onboard devices embedded in the carrier.

* * * * *